(12) United States Patent
Olien

(10) Patent No.: US 8,154,537 B2
(45) Date of Patent: Apr. 10, 2012

(54) RESISTIVE ACTUATOR WITH DYNAMIC VARIATIONS OF FRICTIONAL FORCES

(75) Inventor: Neil Thomas Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 1004 days.

(21) Appl. No.: 11/839,728

(22) Filed: Aug. 16, 2007

(65) Prior Publication Data

US 2009/0046054 A1 Feb. 19, 2009

(51) Int. Cl.
*G06F 3/033* (2006.01)
(52) U.S. Cl. .......................... 345/184; 715/701; 345/156
(58) Field of Classification Search .................. 345/184, 345/156, 157; 188/72.1
See application file for complete search history.

(56) References Cited

U.S. PATENT DOCUMENTS

| 7,198,137 | B2 | 4/2007 | Olien |
| 2004/0059245 | A1 | 3/2004 | Watanabe et al. |
| 2005/0275967 | A1 | 12/2005 | Olien et al. |
| 2006/0033703 | A1 | 2/2006 | Olien et al. |
| 2006/0054427 | A1* | 3/2006 | Jasso et al. ................. 188/72.1 |
| 2008/0196541 | A1 | 8/2008 | Kramlich |

FOREIGN PATENT DOCUMENTS

| WO | WO 2006/130723 A2 | 12/2006 |
| WO | WO 2007/003394 A1 | 1/2007 |

OTHER PUBLICATIONS

International Search Report and Written Opinion—PCT/US2008/070028.
PR-1000 TouchSense Programmable Rotary Module, http://www.immersion.com/industrial/docs/tsrotary_feb07_v.4-Ir.pdf.

* cited by examiner

*Primary Examiner* — Alexander Eisen
*Assistant Examiner* — Cory Almeida
(74) *Attorney, Agent, or Firm* — Squire Sanders (US) LLP

(57) ABSTRACT

A system for generating haptic effects on a rotary knob includes an electrical coil and a core. A first level of voltage is applied to the coil to enable a first surface interface having a first coefficient of friction and to generate a first haptic effect by varying the voltage. A second level of voltage is applied to the coil to enable a second surface interface having a second coefficient of friction that is greater than the first coefficient of friction and to generate a second haptic effect by varying the voltage.

23 Claims, 5 Drawing Sheets

RESISTIVE ACTUATOR WITH DYNAMIC VARIATIONS OF FRICTIONAL FORCES

FIELD OF THE INVENTION

One embodiment of the present invention is directed to haptic feedback. More particularly, one embodiment of the present invention is directed to a rotary knob having haptic feedback.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface.

Haptic feedback has been implemented on rotary knobs and other types of electromechanical devices such as mechanical switches and encoders to create a flexible user interface. A wide variety of available haptic feedback, including detents, barriers and vibrations provide the user with advantages in usability, design and cost.

Generally, haptic feedback is generated on a rotary knob with a motor-based actuator system or a braking-based actuator system. A motor-based actuator system applies a force to either oppose or to reinforce a user's motions. However, because a motor always adds energy to the system, it can become unstable. Further, a motor-based actuator system requires a relatively large and costly motor to generate the required amount of torque.

In contrast, a braking-based actuator system uses braking actuators that dissipate energy and resist user motion through friction. A braking-based actuator system is generally smaller and less expensive than a motor-based actuator system and does not become unstable since it takes energy out of the system.

One problem with known rotary knobs having a braking actuator system is that a magnetic air gap must be maintained between two metallic rigid devices. This air gap must typically be maintained within a tight tolerance, thus making manufacturing of the device expensive and difficult. Further, known rotary knobs with braking actuators typically only include one level of frictional braking. However, some desired haptic feedback is more effective if it includes multiple levels of frictional forces.

Based on the foregoing, there is a need for an improved frictional braking actuator system.

SUMMARY OF THE INVENTION

One embodiment is a system for generating haptic effects on a rotary knob. The system includes an electrical coil and a core. A first level of voltage is applied to the coil to enable a first surface interface having a first coefficient of friction and to generate a first haptic effect by varying the voltage. A second level of voltage is applied to the coil to enable a second surface interface having a second coefficient of friction that is greater than the first coefficient of friction and to generate a second haptic effect by varying the voltage.

DETAILED DESCRIPTION

One embodiment is a rotary knob having a resistive actuator that includes a dynamic variation of frictional forces by varying the interfaces of surfaces.

Figure 1:
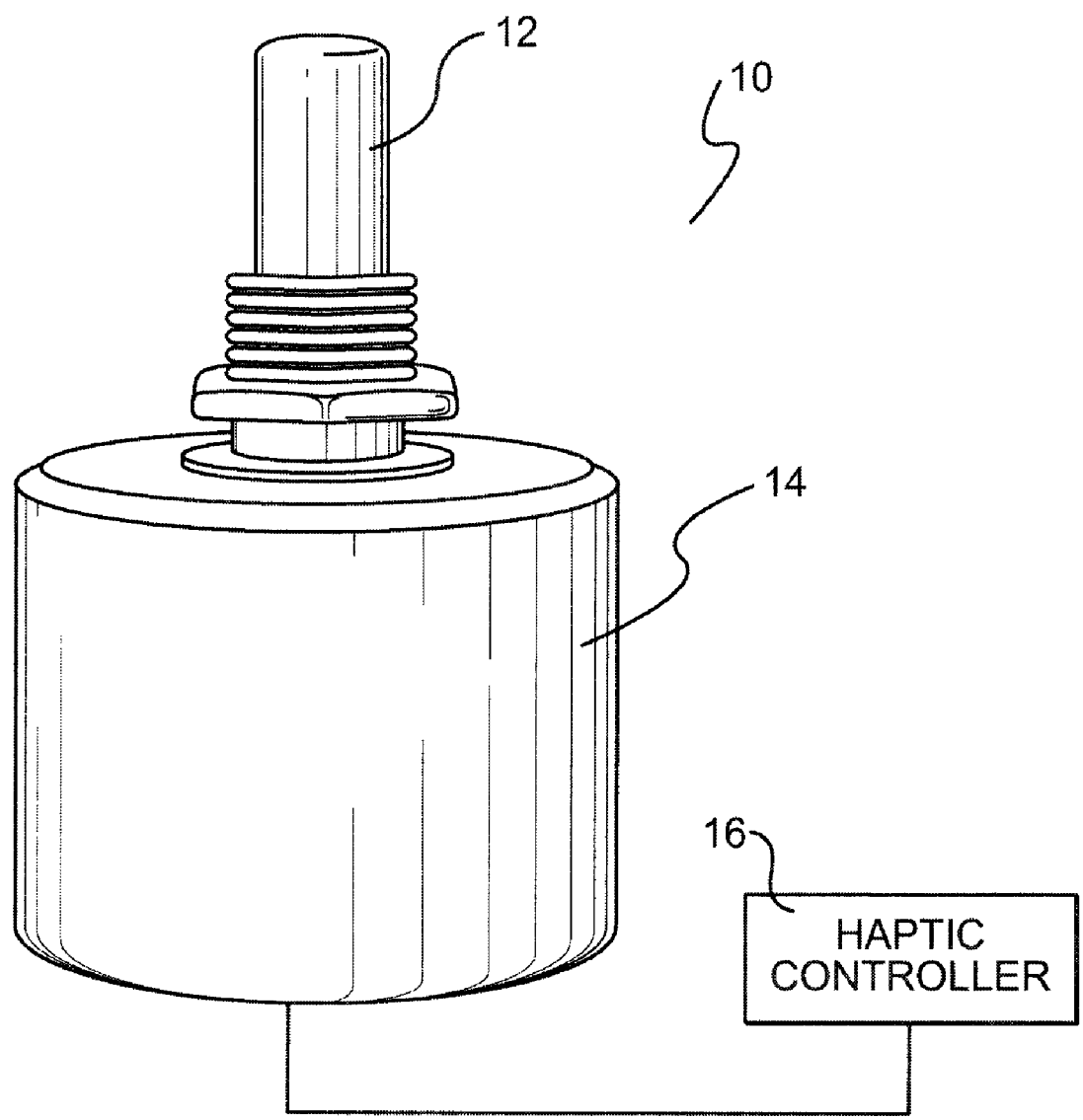
FIG. 1 is a perspective view of a rotary knob in accordance with one embodiment.

FIG. 1 is a perspective view of a rotary knob 10 in accordance with one embodiment. Rotary knob 10 includes a base 14, a rotating shaft 12, and a haptic controller 16. Rotating shaft 12 may be coupled to a knob or other device that can be rotated by a user. Controller 16 may include a processor and memory that stores instructions that are executed by the processor. Controller 16 generates haptic effects that are applied when rotating shaft 12 is rotated by a user. Controller 16 may be located external to base 14 as shown in FIG. 1, or internal to base 14.

Figure 2:
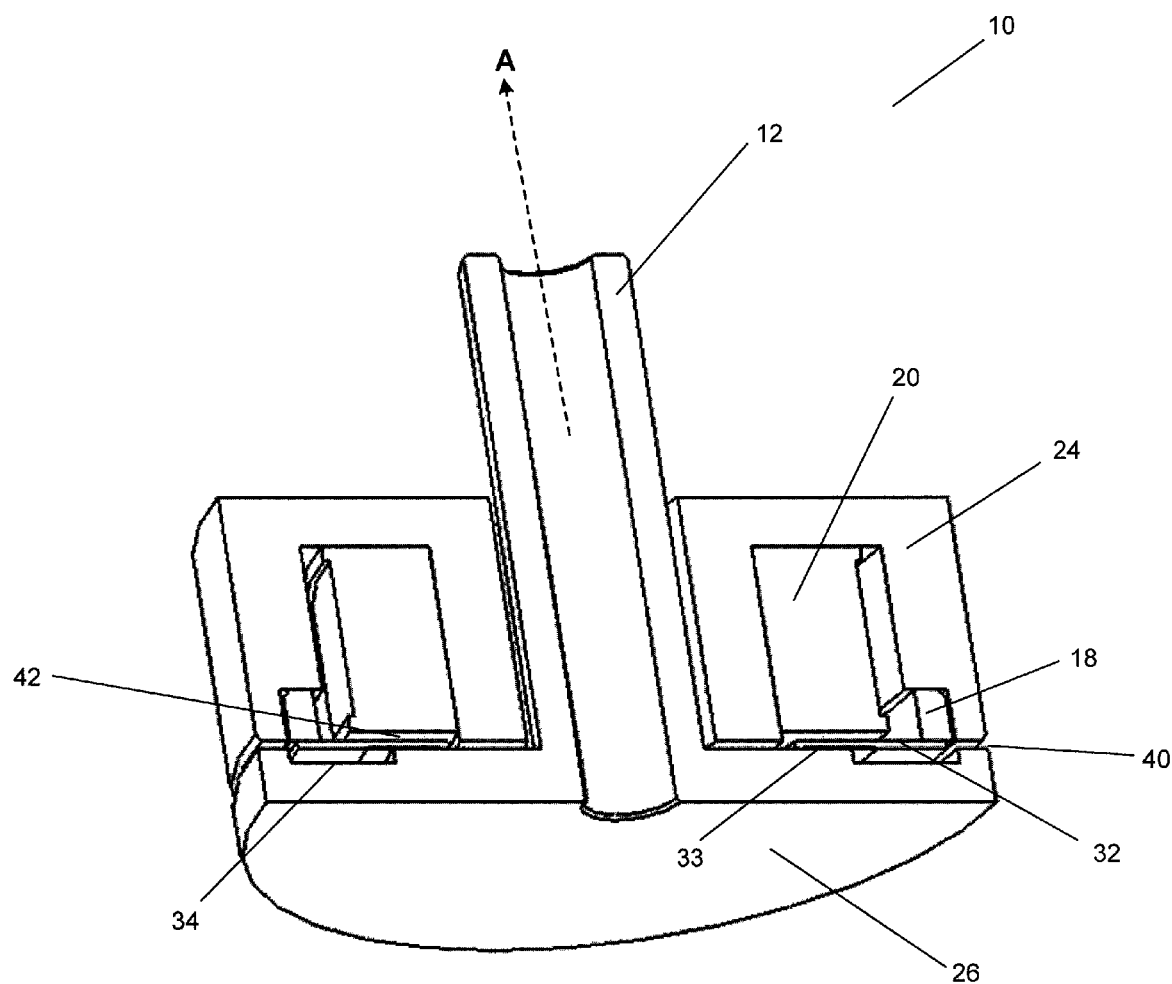
FIG. 2 is a cut-away perspective view of the rotary knob in accordance with one embodiment.

FIG. 2 is a cut-away perspective view of rotary knob 10 in accordance with one embodiment. Knob 10 includes shaft 12 which is coupled to a rotating circular disk 26 or any other type of rotating element. It one embodiment, circular disk 26 is formed from nickel-plated steel or any material that is capable of being attracted to a magnetic force. Disk 26 and shaft 12 rotate around axis A when shaft 12 is rotated by a user.

Surrounding shaft 12 is a magnetic core 24 and an electromagnetic coil 20. Electromagnetic coil 20 is coupled to an electrical source (not shown) and when electricity is applied it causes magnetic core 24 to generate a magnetic force in a known manner. In one embodiment, electromagnetic coil 20 is formed from a copper coil and core 24 is formed from a copper bobbin. However, coil 20 and core 24 can be formed from any other materials that causes a magnetic force to be generated upon the application of electricity.

A washer 32 or other type of separating element is coupled to disk 26 at a portion 33 along an inner circumferential ring of washer 32. The remainder of washer 32 extends across a groove 34 formed around the underside of disk 26. Washer 32 is flexible so that it can function as a spring through a cantilever effect as its outer circumference flexes back and forth within groove 34. In one embodiment, washer 32 is formed from bronze but it can be formed of any material that provides an acceptable level of friction and flexibility.

A friction ring 18 or other type of frictional element is coupled to core 24. Friction ring 18 contacts washer 32 at surface interface 42 ("a first surface interface"), which provides a braking effect on the rotation of shaft 12 through friction. When a first level of electricity is applied to coil 20, the normal force on washer 32, which is in contact with friction ring 18, is increased as disk 26 is magnetically attracted to core 24. The amount of friction formed by the contact of ring 18 and washer 32 provides a relatively lower coefficient of friction and is enabled/controlled upon application of the first level of electricity. In one embodiment, friction ring 18 is formed from a thermoplastic polymer, an acetal resin, or any other material that provides the desired friction force and wear characteristics.

In addition to providing friction at the contact area of friction ring 18 and washer 32, washer 32 in an non-flexed state further provides a magnetic circuit air gap 40 between disk 26 and core 24.

When a second level of electricity that is greater than the first level of electricity is applied to core 20, the magnetic attraction between core 24 and disk 26 is further increased. This causes washer 32 to be flexed into groove 34, which ultimately causes gap 40 to close and allows disk 26 to contact core 24 ("a second surface interface"). The coefficient of friction at the interface of disk 26 and core 24, which in one embodiment are both metallic surfaces, is substantially higher than the coefficient of friction at the interface of friction ring 18 and washer 32.

In operation, haptic effects can be generated using the first or second level of friction and varying voltage levels so the amount of friction can vary within each level. For example, haptic effects such as detents can be generated through the first surface interface of friction ring 18 and washer 32, while maintaining gap 40. Because of gap 40, large changes of voltage applied to core 24 will produce small changes in torque, which is ideal for detent effects. Complex haptic effects can be generated by varying the voltage levels within a range that maintains gap 40.

When the amount of voltage applied to core 24 is substantially increased, gap 40 closes and disk 26 contacts core 24, thus generating a substantially increased second level of friction. This larger amount of friction is useful for creating "hard" resistance haptic effects such as barrier effects. Further, the higher friction coefficients of this second surface interface allows high torques with lower magnetic forces, which is advantageous. When the amount of voltage is lowered or eliminated, the spring effect of washer 32 causes disk 26 and core 24 to separate and gap 40 to form again. Further, during the period of time when the second surface interface is enabled, the first surface interface may also be enabled (i.e., disk 26 and core 24 are coupled and friction ring 18 and washer 32 are coupled). However, the second surface interface will generally determine the amount of friction since it has a much higher coefficient of friction than the first surface interface.

Figure 3:
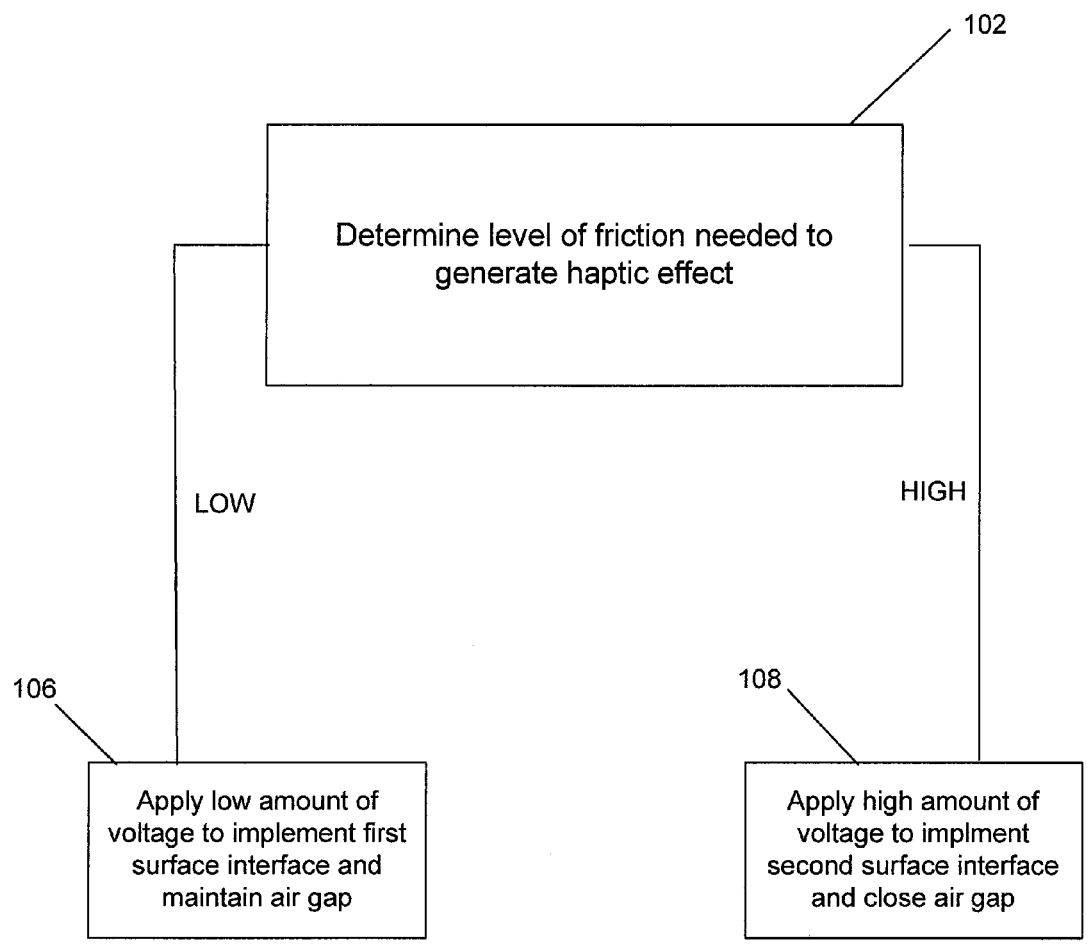
FIG. 3 is a flow diagram of the functionality of a controller in accordance with one embodiment when generating haptic effects.

In one embodiment controller 16 determines what haptic effects are to be played and the order in which the effects are played based on high level parameters. In general, the high level parameters that define a particular haptic effect include magnitude, frequency and duration. The particular haptic effect might involve friction generated by the first surface interface, the second surface interface, or any combination of both interfaces. FIG. 3 is a flow diagram of the functionality of controller 12 in accordance with one embodiment when generating haptic effects. The functionality of FIG. 3 can be implemented by hardware or software, or any combination of hardware or software.

At 102, the level of friction need to generate the haptic effect is determined. The level needed is typically based on the specific haptic effect. For example, a detent effect requires a relatively low level of friction while a barrier effect requires a relatively high level of friction.

If a relatively low level of friction is required, then at 106 an amount of voltage is applied to coil 20 to enable the first surface interface (i.e., washer 34 and frictional ring 18) while maintaining air gap 40. If a relatively high level of friction is required, then at 108 an amount of voltage is applied to coil 20 to enable the second surface interface (i.e., disk 26 and core 24) and close air gap 40. While the second surface interface is enabled, the first surface interface can also be enabled.

Figure 4:
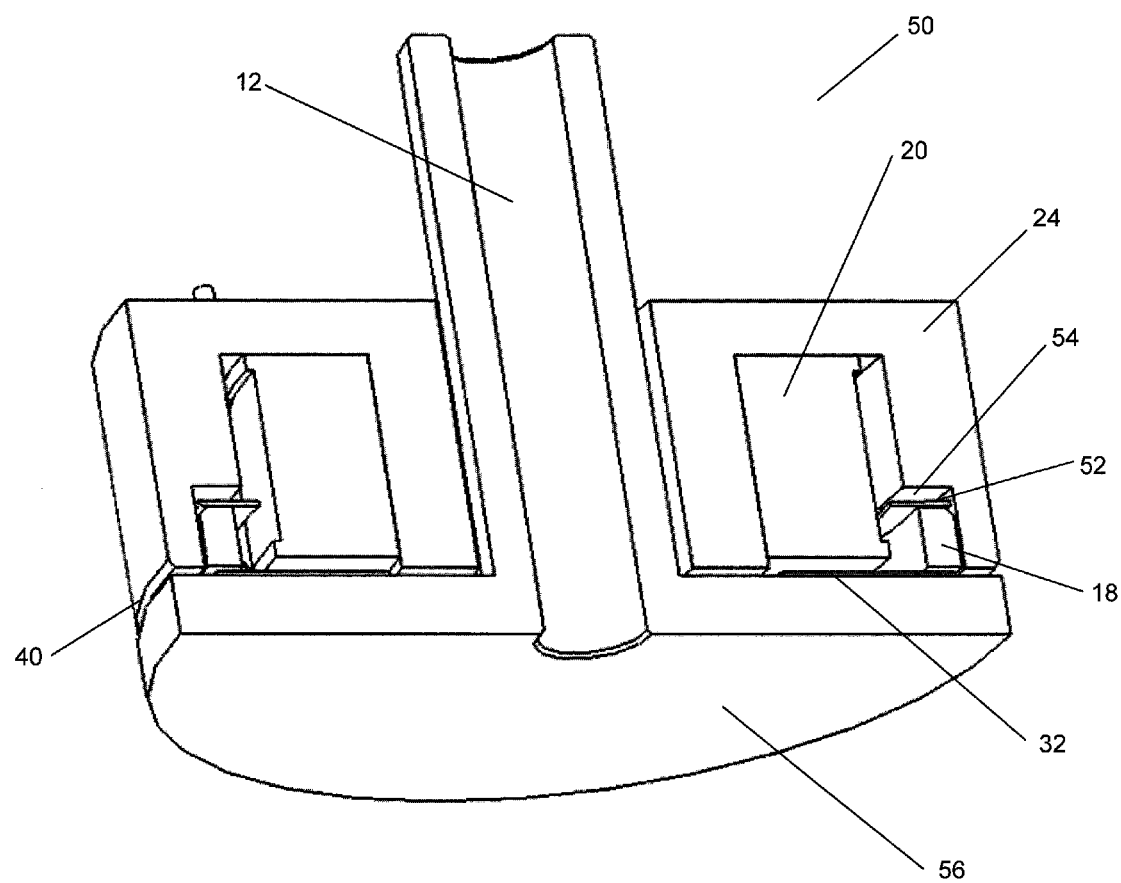
FIG. 4 is a cut-away perspective view of a rotary knob in accordance with another embodiment.

FIG. 4 is a cut-away perspective view of a rotary knob 50 in accordance with another embodiment. In rotary knob 50, disk 56 does not include a groove. Instead, a spring 52 is coupled to friction ring 18 on the opposite side of where friction ring 18 contacts washer 32 to form the first surface interface. In one embodiment, spring 52 is a bronze washer. Spring 52 is further coupled to coil 20 to create a cantilever spring effect. When the voltage applied to coil 20 exceeds a sufficient level, spring 52 flexes towards surface 54 of core 24 causing gap 40 to close. The interface of disk 56 and core 24 is the second surface interface. Otherwise, rotary knob 50 operates in a similar manner as knob 10.

Figure 5:
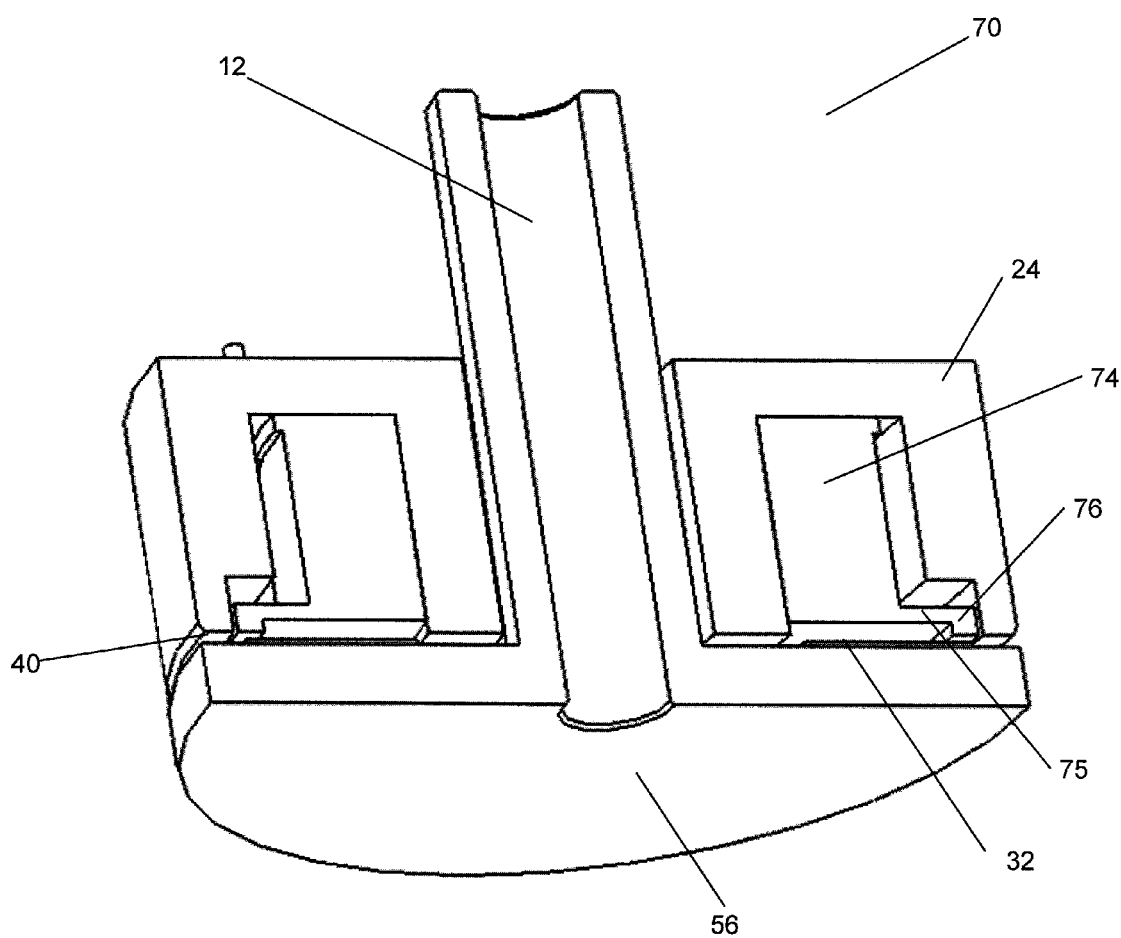
FIG. 5 is a cut-away perspective view of a rotary knob in accordance with another embodiment.

FIG. 5 is a cut-away perspective view of a rotary knob 70 in accordance with another embodiment. In the embodiment of FIG. 5, the frictional element 76 is coupled to the coil 74 by a spring extension 75 in a cantilevered arrangement. Frictional element 76 is in contact with washer 32 as a first level of voltage is applied to coil 74, thus enabling a first surface interface. When the voltage applied to coil 74 exceeds a sufficient level, frictional element 76 flexes towards core 24, causing gap 40 to close. The interface of disk 56 and core 24 is the second surface interface. Otherwise, rotary knob 70 operates in a similar manner as knob 10.

As disclosed, embodiments allow for varied and more effective haptic effects through the use of at least two surface interfaces which create two distinctly different coefficients of friction.

Several embodiments are specifically illustrated and/or described herein. However, it will be appreciated that modifications and variations of the present invention are covered by the above teachings and within the purview of the appended claims without departing from the spirit and intended scope of the invention.

For example, although a rotary knob is disclosed, the present invention can be used in any device that implements resistive haptic effects, including, for example, a joystick, a rotary scroll wheel or slider.

What is claimed is:

1. A resistive haptic actuator comprising:
   an electrical coil;
   a core coupled to the electrical coil;
   a first surface interface having a first coefficient of friction that is enabled upon application of a first level of voltage on the coil, wherein the first surface interface comprises a first contact between a first element and a second element; and
   a second surface interface having a second coefficient of friction that is enabled upon application of a second level of voltage on the coil, wherein the second surface interface comprises a second contact between a third element and a fourth element;
   wherein a gap is present between the third element and the fourth element when the first level of voltage is applied.

2. The resistive haptic actuator of claim 1, further comprising:
   a frictional element; and
   a spring coupled to the frictional element.

3. The resistive haptic actuator of claim 2, wherein the first contact comprises contact between the frictional element and a washer.

4. The resistive haptic actuator of claim 3, further comprising:
   a shaft; and
   a rotating element coupled to the shaft;
   wherein the second contact comprises the rotating element contacting the core.

5. The resistive haptic actuator of claim 4, further comprising:
a separating element coupled between the rotating element and the core that creates the gap between the rotating element and the core in an absence of a voltage applied to the coil.

6. The resistive haptic actuator of claim 5, wherein the separating element is comprised of the washer.

7. The resistive haptic actuator of claim 5, wherein the separating element is comprised of the spring.

8. The resistive haptic actuator of claim 2, wherein the frictional element is coupled to the coil.

9. The resistive haptic actuator of claim 1, further comprising a haptic controller that controls the first and second levels of voltage to implement a haptic effect.

10. The actuator of claim 1, wherein the second coefficient of friction is greater than the first coefficient of friction.

11. A method of generating haptic effects for a resistive haptic actuator, the method comprising:
applying a first level of voltage to enable a first surface interface having a first coefficient of friction and generate a first haptic effect, wherein the first surface interface comprises a first area of contact between a first element and a second element; and
applying a second level of voltage to enable a second surface interface having a second coefficient of friction and generate a second haptic effect, wherein the second surface interface comprises a second area of contact between a third element and a fourth element;
wherein an air gap is present between the third element and the fourth element when the first level of voltage is applied.

12. The method of claim 11, wherein the first area of contact comprises a frictional element against a surface.

13. The method of claim 12, wherein the frictional element is coupled to a spring.

14. The method of claim 11, wherein the second area of contact comprises a core against a rotating element that is coupled to a shaft.

15. The method of claim 11, wherein the first and second haptic effects are generated on a rotating shaft.

16. The method of claim 15, wherein the shaft is coupled to a rotating element and is surrounded by a magnetic coil and a core.

17. The method of claim 16, further comprising maintaining the air gap between the rotating element and the core while applying the first level of voltage.

18. The method of claim 17, further comprising eliminating the air gap while applying the second level of voltage.

19. The method of claim 11, wherein the second coefficient of friction is greater than the first coefficient of friction.

20. A system for generating haptic effects for a resistive haptic actuator comprising:
means for applying a first level of voltage to enable a first surface interface having a first coefficient of friction and generate a first haptic effect, wherein the first surface interface comprises a first contact between a first element and a second element; and
means for applying a second level of voltage to enable a second surface interface having a second coefficient of friction and generate a second haptic effect, wherein the second surface interface comprises a second contact between a third element and a fourth element;
wherein a gap is present between the third element and the fourth element when the first level of voltage is applied.

21. A computer readable medium having instructions stored thereon that, when executed by a processor, causes the processor to generate haptic effects for a resistive haptic actuator by:
applying a first level of voltage to enable a first surface interface having a first coefficient of friction and generate a first haptic effect, wherein the first surface interface comprises a first contact between a first element and a second element; and
applying a second level of voltage to enable a second surface interface having a second coefficient of friction and generate a second haptic effect, wherein the second surface interface comprises a second contact between a third element and a fourth element;
wherein a gap is present between the third element and the fourth element when the first level of voltage is applied.

22. A method of generating haptic effects for a resistive haptic actuator comprising:
applying a first amount of voltage to implement a first surface interface having a first coefficient of friction and maintain an air gap, wherein the first surface interface comprises a first contact between a first element and a second element; and
applying a second amount of voltage to implement a second surface interface having a second coefficient of friction and close the air gap, wherein the second surface interface comprises a second contact between a third element and a fourth element;
wherein the air gap is present between the third element and the fourth element when the first level of voltage is applied.

23. The method of claim 22, wherein the first amount of voltage is less than the second amount of voltage.

* * * * *